(12) United States Patent
Ko et al.

(10) Patent No.: US 10,030,096 B2
(45) Date of Patent: Jul. 24, 2018

(54) COPOLYCARBONATE RESIN AND METHOD FOR PREPARING THE SAME

(71) Applicant: LG CHEM, LTD., Seoul (KR)

(72) Inventors: Un Ko, Daejeon (KR); Hyoung Min Bahn, Daejeon (KR); Byoung Kyu Chun, Daejeon (KR); Jung Jun Park, Daejeon (KR); Ki Jae Lee, Daejeon (KR); Young Wook Son, Daejeon (KR); Moo Ho Hong, Daejeon (KR); Young Young Hwang, Daejeon (KR); Min Jeong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/508,449

(22) PCT Filed: Jun. 22, 2016

(86) PCT No.: PCT/KR2016/006590
§ 371 (c)(1),
(2) Date: Mar. 2, 2017

(87) PCT Pub. No.: WO2017/003123
PCT Pub. Date: Jan. 5, 2017

(65) Prior Publication Data
US 2017/0283547 A1    Oct. 5, 2017

(30) Foreign Application Priority Data

Jul. 1, 2015   (KR) .................. 10-2015-0094030
Jun. 13, 2016  (KR) .................. 10-2016-0072892

(51) Int. Cl.
*C08J 5/00*    (2006.01)
*C08G 63/64*   (2006.01)
*C08L 69/00*   (2006.01)
*C08K 5/1515*  (2006.01)
*C08K 5/527*   (2006.01)
*C08L 83/04*   (2006.01)

(52) U.S. Cl.
CPC ............. *C08G 63/64* (2013.01); *C08J 5/00* (2013.01); *C08K 5/1515* (2013.01); *C08K 5/527* (2013.01); *C08L 69/005* (2013.01); *C08L 83/04* (2013.01); *C08G 2120/00* (2013.01); *C08J 2369/00* (2013.01); *C08J 2463/00* (2013.01); *C08J 2483/04* (2013.01); *C08L 2205/03* (2013.01); *C08L 2205/06* (2013.01)

(58) Field of Classification Search
USPC ................................ 523/451; 528/196, 198
See application file for complete search history.

(56) References Cited

U.S. PATENT DOCUMENTS

2007/0117957 A1   5/2007  Mullen

FOREIGN PATENT DOCUMENTS

| CN | 1918210       | A  | 2/2007  |
| CN | 101124282     | A  | 2/2008  |
| CN | 101616988     | A  | 12/2009 |
| JP | 2005232252    | A  | 9/2005  |
| KR | 1020020016922 | A  | 3/2002  |
| KR | 1020070012346 | A  | 1/2007  |
| KR | 1020080071992 | A  | 8/2008  |
| KR | 1020090087081 | A  | 8/2009  |
| KR | 1020150037663 | A  | 4/2015  |
| WO | 2013/175445   | A2 | 11/2013 |

*Primary Examiner* — Terressa M Boykin
(74) *Attorney, Agent, or Firm* — Dentons US LLP

(57) ABSTRACT

The present disclosure relates to a polycarbonate resin and a method of preparing the same, has an effect of providing a polycarbonate resin having superior chemical resistance and wear resistance due to application of a predetermined comonomer thereto, and a method of preparing the same.

20 Claims, No Drawings

COPOLYCARBONATE RESIN AND METHOD FOR PREPARING THE SAME

CROSS-REFERENCE TO RELATED APPLICATIONS

This application is a National Stage Application of International Application No. PCT/KR2016/006590, filed Jun. 22, 2016, and claims the benefit of Korean Patent Application No. 10-2015-0094030, filed Jul. 1, 2015, and Korean Patent Application No. 10-2016-0072892, filed Jun. 13, 2016, the contents of which are incorporated herein by reference in their entirety for all purposes as if fully set forth below.

TECHNICAL FIELD

The present disclosure relates to a copolycarbonate resin and a method of preparing the same, and more particularly, a copolycarbonate resin including a predetermined comonomer and, accordingly, having superior chemical resistance and wear resistance, and a method of preparing the same.

BACKGROUND ART

Polycarbonate resin is prepared by condensation-polymerizing an aromatic diol, such as bisphenol A, with a carbonate precursor, such as phosgene. Polycarbonate resin has properties such as superior impact strength, dimensional stability, heat resistance, and transparency, and thus, is used in various fields such as exterior materials of electrical and electronic products, automobile components, construction materials, and optical components.

To apply such polycarbonate resin to a wider variety of fields, research into introducing monomers with different structures to a main branch of polycarbonate by copolymerizing two or more aromatic diols with different structures and thus obtaining desired properties is actively underway.

However, application of such polycarbonate resin to products requiring chemical resistance and wear resistance is limited due to poor chemical resistance and wear resistance thereof.

RELATED ART DOCUMENT

Patent Document

Korean Patent Laid-Open Publication No. 2002-0016922 (Mar. 6, 2002)

DISCLOSURE

Technical Problem

Therefore, the present invention has been made in view of the above problems, and it is one object of the present invention to provide a copolycarbonate resin containing predetermined modified poly(alkylene dicarboxylate) as a comonomer and a method of preparing the same.

It is another object of the present invention to provide a molded article prepared from the copolycarbonate resin.

The above and other objects can be accomplished by the present invention described below.

Technical Solution

In accordance with one aspect of the present invention, provided is a polymerized copolycarbonate resin including a bisphenol based monomer, a comonomer represented by Formula 1 below, and a carbonate precursor:

[Formula 1]

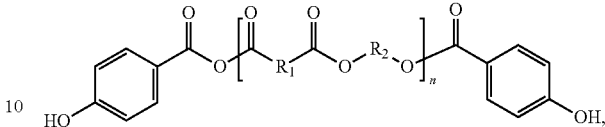

wherein R1 and R2 are each independently $C_1$ to $C_{10}$ alkylene and n is an integer of 1 to 50.

In accordance with another aspect of the present invention, provided is a method of preparing a copolycarbonate resin, the method including interfacially polymerizing a bisphenol based monomer, a comonomer represented by Formula 1, and a carbonate precursor.

In accordance with yet another aspect of the present invention, provided is a molded article prepared from the copolycarbonate resin.

Advantageous Effects

As apparent from the foregoing, the present invention advantageously provides a copolycarbonate resin having superior chemical resistance and wear resistance by applying a predetermined comonomer thereto, and a method of preparing the same.

BEST MODE

Hereinafter, the present disclosure will be described in detail.

The present inventors confirmed that, when modified poly(alkylene dicarboxylate) prepared by modifying both ends of poly(alkylene dicarboxylate) with 4-hydroxybenzoic acid is used as a comonomer of a polycarbonate resin, chemical resistance and wear resistance of a polymerized copolycarbonate resin are greatly improved, thus completing the present disclosure.

The copolycarbonate resin of the present disclosure is prepared by polymerizing a bisphenol based monomer, a comonomer represented by Formula 1 below, and a carbonate precursor:

[Formula 1]

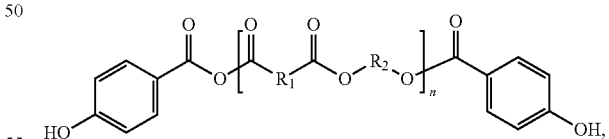

wherein R1 and R2 are each independently $C_1$ to $C_{10}$ alkylene, and n is an integer of 1 to 50)

For example, R1 and R2 are each independently a $C_2$ to $C_6$ alkylene group, or a $C_3$ to $C_5$ alkylene group. Within this range, superior chemical resistance and wear resistance are exhibited.

n is, for example, an integer of 5 to 40, or an integer of 10 to 30. Within this range, superior chemical resistance and wear resistance are exhibited.

The comonomer represented by Formula 1 may be prepared, for example, by 1) condensation-polymerizing alkane diol with dicarboxylic acid to synthesize poly(alkylene dicarboxylate), and then 2) esterificating resultant synthesized poly(alkylene dicarboxylate) with 4-hydroxybenzoic acid as illustrated in Reaction Formula 1 below:

[Reaction Formula 1]

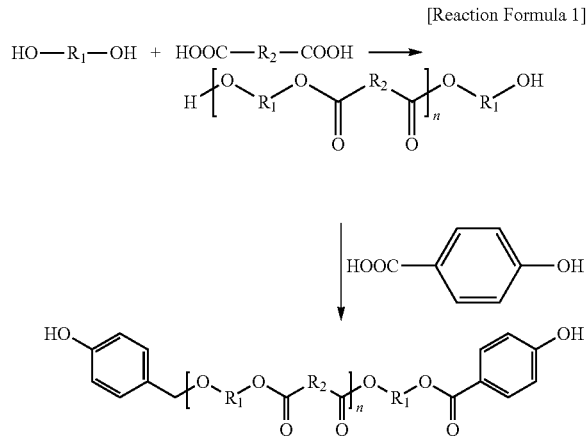

In another embodiment, the esterificating of step 2) may be a step wherein poly(alkylene dicarboxylate) is reacted with 4-acetoxy benzoyl chloride and then a resultant product is hydrolyzed in the presence of a base catalyst, thereby converting an acetoxyl group into a hydroxyl group.

The 4-acetoxy benzoyl chloride may be prepared, for example, by chlorinating 4-acetoxybenzoic acid. The chlorinating is not specifically limited so long as on it is a common method to chlorinate carboxylic acid.

A catalyst, a solvent, and other reaction conditions used in the condensation-polymerizing and the esterificating are not specifically limited so long as they can be generally used in condensation-polymerization or esterification of a diol compound with dicarboxylic acid. As needed, the catalyst, the solvent, and the reaction conditions may be suitably selected.

The comonomer may be included in an amount of, for example, 0.1 to 19% by weight, 0.1 to 15% by weight, 0.5 to 10% by weight, or 0.5 to 5% by weight based on a total weight of the bisphenol based monomer and the comonomer. Within this range, superior chemical resistance and wear resistance are exhibited.

A tin content in the comonomer represented by Formula 1 may be, for example, 10 ppm by mass (based on element) or less, or 5 ppm by mass (based on element) or less. In this case, a prepared copolycarbonate resin exhibits superior thermal stability, particularly at high temperature.

The tin content may be accomplished, for example, by treating a reactive mixture including the compound represented by Formula 1 with an aqueous phosphoric acid solution or a solid adsorbent, but the present invention is not limited thereto.

Upon treatment with the aqueous phosphoric acid solution or the solid adsorbent, an organic layer solvent or a diluent such as, for example, methylene chloride may be used.

The aqueous phosphoric acid solution may be included in an amount of, for example, 0.5 to 40% by mass, 1.0 to 10% by mass, or 2 to 5% by mass. Within this range, extraction efficiency of the tin compound is high, economic feasibility is superior, and environmental pollution may be minimized.

The solid adsorbent is not specifically limited so long as it is a solid adsorbent which may adsorb the tin compound. The solid adsorbent may be, for example, activated white clay; acidic white clay; ion exchange resin; chelate resin; active carbon; a composite adsorbent composed of silica, magnesia, alumina, etc.

In another embodiment, a hydroxybenzoic acid content in the comonomer represented by Formula 1 is 500 ppm or less by mass, or 100 ppm or less by mass. In this case, a prepared copolycarbonate resin has superior thermal stability, particularly at high temperature. In addition, upon interfacial polymerization of the copolycarbonate resin, an aqueous phase is easily separated from an organic phase during a washing process.

In another embodiment, a hydroxybenzoic acid alkyl ester content in the comonomer represented by Formula 1 may be 1.0% by mass or less, or 0.5% by mass or less. In this case, a prepared copolycarbonate resin exhibits superior thermal stability, particularly at high temperature. In addition, molecular weight variation due to hydroxybenzoic acid alkyl ester which may function as a terminal stopper upon the interfacial polymerization of the copolycarbonate resin may be minimized.

The tin content may be measured, for example, by means of an inductively coupled plasma optical emission spectrometer (ICP-OES). In a particular example, the tin content may be measured by means of ICP-OES SPS-5100 manufactured by SII NanoTechnology according to JIS K0116.

The hydroxybenzoic acid and hydroxybenzoic acid alkyl ester contents may be measured by means of, for example, a high-performance liquid chromatography (HPLC) device. In a particular example, the hydroxybenzoic acid and hydroxybenzoic acid alkyl ester contents may be measured under conditions of a column temperature of 40° C., a solvent mixture including 0.5% by mass of an aqueous phosphoric acid solution and acetonitrile (mixed in an amount ratio of 1:2), a flow velocity of 1.0 ml/min based on calibration curves of hydroxybenzoic acid and hydroxybenzoic acid alkyl ester, as standard materials, by means of an ODS-3 column manufactured by GL Science.

The bisphenol based monomer may be, for example, one or more selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane (bisphenol A), 2,2-bis(4-hydroxyphenyl)butane, 1,1-bis(4-hydroxyphenyl)cyclohexane (bisphenol Z), 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl) diphenylmethane, and α,ω-bis[3-(o-hydroxyphenyl)propyl] polydimethylsiloxane. Preferably, the bisphenol based monomer is bisphenol A. In this case, flowability of a resin may increase.

The amount of the bisphenol based monomer may be, for example, 81 to 99.9% by weight, 85 to 99.9% by weight, 90 to 99.5% by weight, or 95 to 99.5% by weight based on a total weight of the bisphenol based monomer and the comonomer. Within this range, the polycarbonate resin exhibits superior intrinsic properties thereof.

The carbonate precursor may be, for example, a compound represented by Formula 2 below. Within this range, the polycarbonate resin exhibits superior intrinsic properties thereof:

[Formula 2]

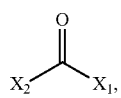

wherein X1, X2 are each independently a halogen, a haloalkyl group, a halocycloalkyl group, a haloaryl group, an alkoxy group or a haloalkoxy group.

In another embodiment, the carbonate precursor may be one or more selected from the group consisting of dimethyl carbonate, diethyl carbonate, dibutyl carbonate, dicyclohexyl carbonate, diphenyl carbonate, ditolyl carbonate, bis(chlorophenyl) carbonate, di-m-cresyl carbonate, dinaphthyl carbonate, bis(diphenyl) carbonate, phosgene, triphosgene, diphosgene, bromophosgene and bishaloformate. Preferably, the carbonate precursor is triphosgene or phosgene. In this case, the intrinsic properties of the polycarbonate resin may be provided thereto.

The amount of the carbonate precursor may be, for example, 10 to 150 parts by weight, 30 to 100 parts by weight, or 40 to 70 parts by weight based on 100 parts by weight of a total of the bisphenol based monomer and the comonomer. Within this range, the polycarbonate resin exhibits superior intrinsic properties thereof.

For example, a molecular weight regulator may be further included upon polymerization of the copolycarbonate.

The molecular weight regulator may be, for example, mono-alkylphenol.

The mono-alkylphenol may be, for example, one or more selected from the group consisting of p-tert-butylphenol, p-cumylphenol, decylphenol, dodecylphenol, tetradecylphenol, hexadecylphenol, octadecylphenol, eicosylphenol, docosylphenol, and triacontylphenol. Preferably, the mono-alkylphenol is para-tert-butylphenol. In this case, superior molecular weight control effect may be provided.

The amount of the molecular weight regulator may be, for example, 0.1 to 10 parts by weight, 0.1 to 6 parts by weight, or 1 to 5 parts by weight based on 100 parts by weight of a total of the bisphenol based monomer and the comonomer. Within this range, a target molecular weight may be obtained.

The weight-average molecular weight of the copolycarbonate resin may be, for example, 10,000 to 50,000 g/mol, 25,000 to 45,000 g/mol, or 20,000 to 40,000 g/mol. Within this range, superior chemical resistance and wear resistance are provided.

After the copolycarbonate resin is brought into contact with, for example, 20% by weight of an aqueous HCl solution for 168 hours according to ASTM D543, a weight reduction amount thereof is 10% by weight. Within this range, superior chemical resistance is provided.

After the copolycarbonate resin is contacted with, for example, methanol for 168 hours according to ASTM D543, a weight reduction amount thereof is 10% by weight, preferably 3% by weight or less. Within this range, superior chemical resistance is provided.

In the present disclosure, the weight reduction amount (%) refers to ((weight before contact−weight after contact)/weight before contact)×100.

The wear resistance of the copolycarbonate resin may be, for example, 1 B or more according to ASTM D3363. Preferably, the wear resistance is HB or more. Within this range, the copolycarbonate resin may be applied to products requiring high wear resistance.

The copolycarbonate resin composition of the present disclosure includes 100 parts by weight of the copolycarbonate resin, 0.005 to 0.5 parts by weight of a diphosphite compound, 0.001 to 0.5 parts by weight of an alicyclic epoxy compound, and 0.01 to 1 parts by weight of modified silicone.

The diphosphite compound is, for example, bis(2,4-dicumylphenyl)pentaerythritol diphosphite. In a particular example, the diphosphite compound may be Doverphos S-9228PC, in which the content of a remaining sodium ingredient is 1 ppm or less by mass and which is manufactured by Dover Chemical. In this case, upon molding at high temperature, superior thermal stability and excellent light transmittance, luminance and weather resistance are provided.

The alicyclic epoxy compound may be, for example, 3,4-epoxycyclohexenylmethyl-3',4'-epoxycyclohexenecarboxylate, composite of 1,2-epoxy-4-(2-oxiranyl)cyclohexane and 2,2-bis(hydroxymethyl)-1-butanol, or a mixture thereof. In a specific example, the alicyclic epoxy compound may be 2021P, EHPE3150 or EHPE3150CE manufactured by Daicel Chemical Industries.

The modified silicone is, for example, a modified silicone compound containing a functional group, which is prepared by introducing at least one group of a methoxy group, a vinyl group, and a phenyl group to a silicone compound. Preferably, the modified silicone is an organopolysiloxane having a phenyl group, a methoxy group, and a vinyl group. In a particular example, the modified silicone may be KR511 manufactured by Shin-Etsu Chemical Industry Co., Ltd. In this case, thermal stability is improved upon molding.

A method of preparing the copolycarbonate resin of the present disclosure includes a step of interfacially polymerizing the bisphenol based monomer, the comonomer represented by Formula 1 below, and the carbonate precursor:

[Formula 1]

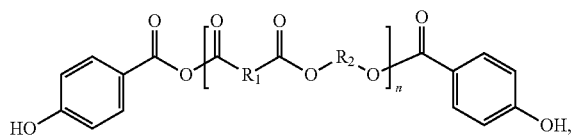

wherein R1 and R2 are each independently $C_1$ to $C_{10}$ alkylene, and n is an integer of 1 to 50.

For example, R1 and R2 are each independently $C_2$ to $C_6$ alkylene or $C_3$ to $C_5$ alkylene groups. Within this range, superior chemical resistance and wear resistance are exhibited.

n is, for example, an integer of 5 to 40 or an integer of 10 to 30. Within this range, superior chemical resistance and wear resistance are exhibited.

The interfacially polymerizing may be carried out, for example, at atmospheric pressure and low temperature and allows easy molecular weight control.

For example, one or more of an acid binder, an organic solvent, and a reaction accelerator may be further included in the interfacially polymerizing.

The interfacially polymerizing may include, for example, a step of feeding a coupling agent after pre-polymerization, and then re-polymerizing. In this case, a copolycarbonate resin with a high molecular weight may be obtained.

Other materials used in the interfacially polymerizing are not specifically limited so long as they can be used in polymerization of polycarbonate. In addition, use amounts of the materials may be controlled as needed.

The acid binder may be, for example, an alkali metal hydroxide, such as sodium hydroxide or potassium hydroxide, or an amine compound such as pyridine.

The organic solvent is not specifically limited so long as it can be used in common polycarbonate polymerization. The organic solvent may be, for example, a halogenated hydrocarbon such as methylene chloride or chlorobenzene.

To facilitate the interfacially polymerizing, for example, a reaction accelerator such as a tertiary amine compound (such as triethylamine, tetra-n-butylammonium bromide, or tetra-n-butylphosphonium bromide), a quaternary ammonium compound, or a quaternary phosphonium compound, or the like may be further included in the interfacially polymerizing.

A reaction temperature of the interfacially polymerizing is, for example, 0 to 40° C. A reaction time thereof is, for example, 10 minutes to 5 hours. Preferred pH during the reaction is, for example, 9 or more or 11 or more.

For example, a molecular weight regulator may be further included in the interfacially polymerizing. Addition of the molecular weight regulator may be carried out before, during, or after polymerization initiation.

A molded article of the present disclosure includes the copolycarbonate resin of the present disclosure.

The molded article may be, for example, an injection-molded article.

The molded article may further include, for example, one or more selected from the group consisting of an antioxidant, a thermal stabilizer, a light stabilizer, a plasticizer, an antistatic agent, a nucleating agent, a flame retardant, a lubricant, an impact modifier, a fluorescence brightening agent, an ultraviolet absorbent, a pigment, and a dye.

A method of manufacturing the molded article may further include, for example, a step of preparing a pellet by uniformly mixing the copolycarbonate resin of the present disclosure with an additive, such as an antioxidant, by means of a mixer and then extrusion-molding a resultant mixture by means of an extruder, followed by drying the pellet and injecting the dried pellet by means of an injection molder.

Now, the present invention will be described in more detail with reference to the following preferred examples. These examples are provided for illustrative purposes only. Various changes and modifications are possible within the scope and technical spirit of the present disclosure, which is obvious to those skilled in the art. It is also obvious that such changes and modifications are included in the appended claims.

EXAMPLES

Example 1

<Preparation of Modified Poly(Alkylene Dicarboxylate) Comonomer>

4-hydroxybenzoic acid was esterified with poly(1,4-butylene adipate) having an average Mn of 2,000 (n=10) to prepare poly(butylene adipate) modified with 4-hydroxybenzoic acid.

The structure of the prepared poly(butylene adipate) modified with 4-hydroxybenzoic acid was investigated by 1H NMR and 13C NMR.

<Preparation of Copolycarbonate Resin>

2044 g of water, 140 g of NaOH, 225.04 g (corresponding to 97% by weight) of bisphenol A (BPA) were fed into a polymerization reactor and mixed and dissolved under a $N_2$ atmosphere. 4.6 g of para-tert butylphenol (PTBP) and 6.96 g (corresponding to 3% by weight) of the previously prepared poly(butylene adipate) modified with 4-hydroxybenzoic acid were dissolved in methylene chloride (MC) and then fed into the polymerization reactor. Subsequently, 128 g of triphosgene (TPG) was dissolved in MC and then fed into the reactor over one hour while maintaining pH 11 or more. 10 minutes later, 46 g of triethylamine (TEA) was fed into the reactor and coupling reaction was allowed. After the coupling reaction for a total of one hour and twenty minutes, pH was lowered to 4 to remove TEA. Washing with distilled water was performed three times. The pH of a produced polymer was adjusted to a neutral pH of 6 to 7. A resultant polymer was re-precipitated in a mixture of methanol and hexane. A resultant product was dried at 120° C., thereby obtaining a final copolycarbonate resin.

The molecular weight of an obtained copolycarbonate resin was measured by means of GPC using a PC standard. As a result, the weight-average molecular weight of the copolycarbonate resin was determined to be 29,700 g/mol.

<Manufacture of Injection-Molded Specimen>

0.050 parts by weight of tris(2,4-di-tert-butylphenyl)phosphite, 0.010 parts by weight of octadecyl-3-(3,5-di-tert-butyl-4-hydroxyphenyl)propionate, and 0.030 parts by weight of pentaerythritol tetrastearate were added to 100 parts by weight of the prepared copolycarbonate resin, followed by pelletizing the same by means of a vent-attached HAAK Mini CTW. Subsequently, a Haze specimen was prepared by injection-molding at 300° C. of a cylinder temperature and a mold temperature of 120° C. by means of a HAAK Minijet injection molder, and using an Izod specimen and a disk (height of 1.5 mm and diameter of 40 mm).

Example 2

Copolycarbonate and a specimen produced therefrom were prepared in the same manner as in Example 1, except that the comonomer of Example 1 was used in an amount of 11.6 g (corresponding to 5% by weight) and bisphenol A was used in an amount of 220.4 g (corresponding to 95% by weight).

The molecular weight of an obtained copolycarbonate resin was measured by means of GPC using a PC standard. As a result, the weight-average molecular weight was determined to be 29,800 g/mol.

Example 3

Copolycarbonate and a specimen produced therefrom were prepared in the same manner as in Example 1, except that the comonomer of Example 1 was used in an amount of 23.2 g (corresponding to 10% by weight) and bisphenol was used in an amount of 208.8 g (corresponding to 90% by weight).

The molecular weight of an obtained copolycarbonate resin was measured by means of GPC using a PC standard. As a result, the weight-average molecular weight was determined to be 29,600 g/mol.

Comparative Example 1

Polycarbonate and a specimen produced therefrom were prepared in the same manner as in Example 1, except that the comonomer of Example 1 was not used.

The molecular weight of an obtained copolycarbonate resin was measured by means of GPC using a PC standard. As a result, the weight-average molecular weight was determined to be 29,700 g/mol.

Comparative Example 2

Copolycarbonate and a specimen produced therefrom were prepared in the same manner as in Example 1, except that the comonomer of Example 1 was used in an amount of 46.4 g (corresponding to 20% by weight) and bisphenol A was used in an amount of 185.6 g (corresponding to 80% by weight).

The molecular weight of an obtained copolycarbonate resin was measured by means of GPC using a PC standard. As a result, the weight-average molecular weight was determined to be 29,900 g/mol.

Experimental Example

Properties of injection-molded specimens prepared according to Examples 1 to 3 and Comparative Examples 1 to 2 were measured according to the following methods. Results are summarized in Table 1 below.

Chemical resistance: After being brought into contact with a solvent for 168 hours according to ASTM D543, a weight reduction amount was measured (evaluation criterion: ⊚—excellent (reduction by 1 to 3% by weight), ○—Good (reduction by 3 to 10% by weight), and Δ—poor (reduction by 10% by weight or more). HCl concentration was 20% and NaOH concentration was 1%.
Wear resistance: Measured according to ASTM D3363.
Impact strength (J/m): Measured according to ASTM D256 (⅛ inch, Notched Izod) at 23° C.
Weight-average molecular weight (g/mol): Measured using Agilent 1200 series and PC standard.

TABLE 1

|  |  | Examples | | | Comparative Examples | |
|---|---|---|---|---|---|---|
|  |  | 1 | 2 | 3 | 1 | 2 |
| Co-monomer | % by weight | 3 | 5 | 10 | X | 20 |
| Chemical resistance (solvent) | HCl | ○ | ○ | ○ | Δ | ⊚ |
|  | NaOH |  | ○ | ○ | Δ | ○ |
|  | MeOH | ○ | ○ | ⊚ | Δ | ⊚ |
|  | Toluene | Δ | ○ | ○ | Δ | ○ |
| Wear resistance |  | 1 B | 1 B | HB | 2B | HB |
| Impact strength | j/m | 870 | 870 | 860 | 880 | 600 |

As shown in Table 1, it can be confirmed that the copolycarbonate resins of the present disclosure (Examples 1 to 3) exhibit improved chemical resistance and wear resistance without reduction of impact strength, compared to the conventional copolycarbonate resin of Comparative Example 1 or the copolycarbonate resin of Comparative Example 2 in which the comonomer represented by Formula 1 is used in a large amount.

Reference Examples 1 to 3

It was confirmed that, when a reactive mixture including poly(butylene adipate) modified with 4-hydroxybenzoic acid obtained according to Example 1 was post-treated, methylene chloride was used as an organic layer solvent or a diluent, a poly(butylene adipate) comonomer modified with 4-hydroxybenzoic acid, which had been subjected to a process of extracting impurities with 3.5% by mass of an aqueous phosphoric acid solution or a process of adsorbing with a silica magnesia-based adsorbent (Mizukalife F-2G manufactured by MIZUSAWA INDUSTRIAL CHEMICALS, Ltd.), was used in preparation of a copolycarbonate resin in the same manner as in Examples 1 to 3, a change degree in the yellow index (ΔYI) of a finally prepared specimen was significantly decreased.

Reference Examples 4 to 6

It was confirmed that, when 100 parts by weight of a copolycarbonate resin obtained according to Example 1, 0.02 parts by weight of bis(2,4-dicumylphenyl)pentaerythritol diphosphite (Doverphos S-9228PC manufactured by Dover Chemical Corporation), 0.02 parts by weight of 3,4-epoxycyclohexenylmethyl-3',4'-epoxycyclohexenecarboxylate (2021P manufactured by Daicel Chemical Industries, Ltd), and 0.1 parts by weight of organopolysiloxane (KR511 manufactured by Shin-Etsu Chemical Industry Co., Ltd.) having a phenyl group, a methoxy group, and a vinyl group were injected according to the method used in the section <Manufacture of injection-molded specimen> of Example 1 to manufacture a specimen for measuring properties, and the manufactured specimen was subjected to a harsh moisture and heat resistance test wherein the specimen was allowed to sit for 500 hours under conditions of residence molding, 85° C., and a humidity of 95% RH, discoloration was low and cracks were not formed.

The invention claimed is:

1. A copolycarbonate resin, wherein the copolycarbonate resin is prepared by polymerizing a bisphenol based monomer, a comonomer represented by Formula 1 below, and a carbonate precursor, and an amount of the comonomer is 0.1 to 19% by weight based on a total weight of the bisphenol based monomer and the comonomer:

[Formula 1]

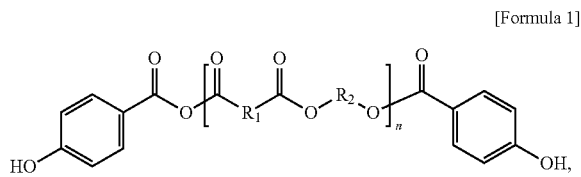

R1 and R2 are each independently $C_1$ to $C_{10}$ alkylene, and n is an integer of 1 to 50.

2. The copolycarbonate resin according to claim 1, wherein the carbonate precursor is comprised in an amount of 10 to 150 parts by weight based on 100 parts by weight of a total of the bisphenol based monomer and the comonomer.

3. The copolycarbonate resin according to claim 1, wherein the bisphenol based monomer is one or more selected from the group consisting of bis(4-hydroxyphenyl) methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane (bisphenol A), 2,2-bis(4-hydroxyphenyl)butane, 1,1-bis(4-hydroxyphenyl)cyclohexane (bisphenol Z), 2,2-bis(4-hydroxy-3,5-dibromophenyl)propane, 2,2-bis(4-hydroxy-3,5-dichlorophenyl)propane, 2,2-bis(4-hydroxy-3- bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

4. The copolycarbonate resin according to claim 1, wherein the carbonate precursor is a compound represented by Formula 2 below:

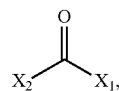

[Formula 2]

wherein X1, X2 are each independently a halogen, a haloalkyl group, a halocycloalkyl group, a haloaryl group, an alkoxy group, or a haloalkoxy group.

5. The copolycarbonate resin according to claim 1, wherein the copolycarbonate further comprises a molecular weight regulator.

6. The copolycarbonate resin according to claim 5, wherein the molecular weight regulator is mono-alkylphenol.

7. The copolycarbonate resin according to claim 5, wherein an amount of the molecular weight regulator is 0.1 to 10 parts by weight based on 100 parts by weight of a total of the bisphenol based monomer and the comonomer.

8. The copolycarbonate resin according to claim 1, wherein a weight-average molecular weight of the copolycarbonate resin is 10,000 to 50,000 g/mol.

9. The copolycarbonate resin according to claim 1, wherein a reduced weight of the copolycarbonate resin after being brought into contact with 20% by weight of an aqueous HCl solution for 168 hours according to ASTM D543 is 10% by weight or less.

10. The copolycarbonate resin according to claim 1, wherein wear resistance of the copolycarbonate resin is 1 B or more according to ASTM D3363.

11. A method of preparing a copolycarbonate resin, the method comprising a step of interfacially polymerizing a bisphenol based monomer, a comonomer represented by Formula 1 below, and a carbonate precursor:

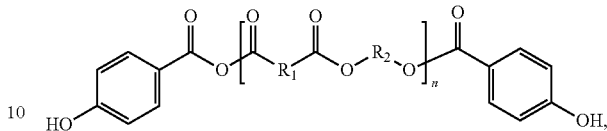

[Formula 1]

wherein R1 and R2 are each independently $C_1$ to $C_{10}$ alkylene, and n is an integer of 1 to 50.

12. The method according to claim 11, wherein, in the interfacially polymerizing, a molecular weight regulator is further comprised.

13. The method according to claim 11, wherein, in the interfacially polymerizing, one or more of an acid binder, an organic solvent, and a reaction accelerator is further comprised.

14. The method according to claim 11, wherein a tin content in the comonomer represented by Formula 1 is 10 ppm or less by mass (based on an element).

15. The method according to claim 11, wherein a hydroxybenzoic acid content in the comonomer represented by Formula 1 is 500 ppm or less by mass.

16. The method according to claim 11, wherein a hydroxybenzoic acid alkyl ester content in the comonomer represented by Formula 1 is 1.0% by mass or less.

17. A copolycarbonate resin composition, comprising 100 parts by weight of the copolycarbonate resin according to claim 1, 0.005 to 0.5 parts by weight of a diphosphite compound, 0.001 to 0.5 parts by weight of alicyclic epoxy compound, and 0.01 to 1 parts by weight of modified silicone.

18. The copolycarbonate resin composition according to claim 17, wherein the diphosphite compound is bis(2,4-dicumylphenyl)pentaerythritol diphosphite.

19. A molded article, comprising the copolycarbonate resin according to claim 1.

20. The molded article according to claim 19, wherein the molded article is an injection-molded article.

* * * * *